United States Patent [19]
Pank

[11] Patent Number: 5,423,589
[45] Date of Patent: Jun. 13, 1995

[54] REAR WINDOW SUN SCREEN

[76] Inventor: Michael J. Pank, 57 Dulwich Ave., Dulwich S.A. 5065, Australia

[21] Appl. No.: 9,346

[22] Filed: Jan. 26, 1993

Related U.S. Application Data

[63] Continuation of Ser. No. 623,912, filed as PCT/AU88/00136, May 9, 1988, abandoned.

[51] Int. Cl.$^6$ .............................................. B60J 3/00
[52] U.S. Cl. ................................................. 296/146.15
[58] Field of Search .................. 160/370.2 R, 368.1, 160/354, DIG. 2; 296/95.1, 97.1, 97.7, 97.8, 97.2, 97.3, 146.15

[56] References Cited

U.S. PATENT DOCUMENTS

| | | | |
|---|---|---|---|
| 1,571,019 | 1/1926 | Lucas . | |
| 3,749,147 | 7/1973 | Hess et al. . | |
| 3,751,100 | 8/1973 | Keyes | 296/95 C |
| 3,753,458 | 8/1973 | Lazarek | 160/354 |
| 3,753,458 | 8/1973 | Lazarek | 160/354 |
| 4,025,103 | 5/1977 | Eichstaedt | 160/370.2 X |
| 4,068,428 | 1/1978 | Peterson | 160/354 X |
| 4,100,957 | 7/1978 | Shelton | 160/368.1 |
| 4,249,589 | 2/1981 | Loeb | 160/354 X |
| 4,560,245 | 12/1985 | Sarver | 160/370.2 X |
| 4,562,675 | 1/1986 | Baigas et al. | 160/354 X |
| 4,790,591 | 12/1983 | Miller | 160/370.2 |
| 4,867,222 | 9/1989 | Roman et al. | 160/354 X |
| 4,993,471 | 2/1991 | Golden | 160/370.2 |

FOREIGN PATENT DOCUMENTS

| | | | |
|---|---|---|---|
| 4035 | 10/1968 | Australia . | |
| 48457 | 5/1974 | Australia . | |
| 53226 | 2/1986 | Australia . | |
| 82268 | 9/1988 | Australia . | |
| 2477214 | 6/1981 | France | 160/354 |
| 2477215 | 6/1981 | France | 160/354 |
| 3028474 | 2/1982 | Germany . | |
| 879130 | 10/1961 | United Kingdom . | |
| 1179748 | 1/1970 | United Kingdom . | |
| 1431011 | 4/1976 | United Kingdom | 160/354 |
| 2157245 | 10/1985 | United Kingdom . | |

Primary Examiner—David M. Purol
Attorney, Agent, or Firm—Cushman Darby & Cushman

[57] ABSTRACT

An arrangement for providing some protection against sun passing through a rear fixed glass window of a motor vehicle which comprises pliable mesh held against the external face of the convex shape of the glass of the rear window with a hook and loop fastening system extending around the periphery of the mesh and being adhered directly to the glass of the rear window. The mesh is comprised of fibres being substantially fiberglass so as to have similar thermal contraction and expansion characteristics as the glass of the motor vehicle window.

8 Claims, 4 Drawing Sheets

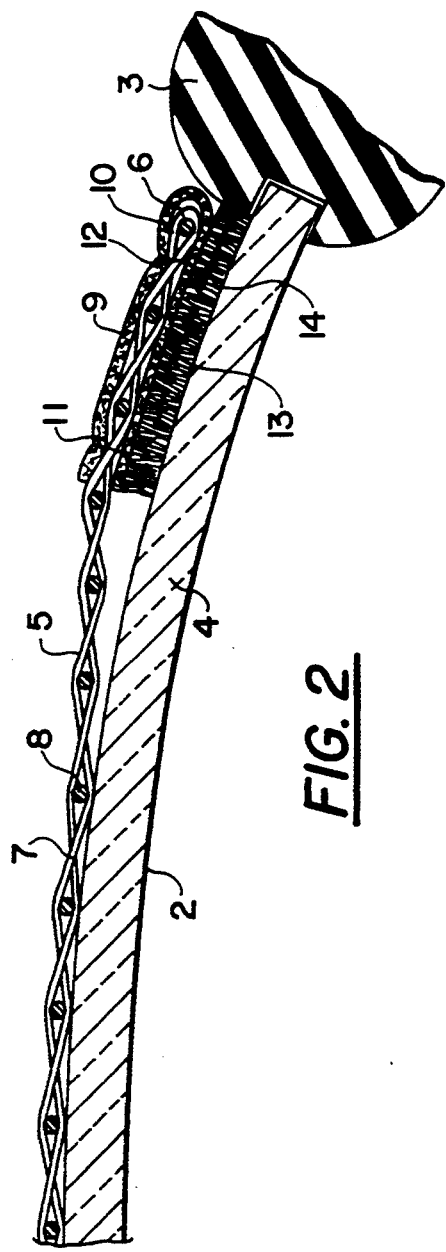
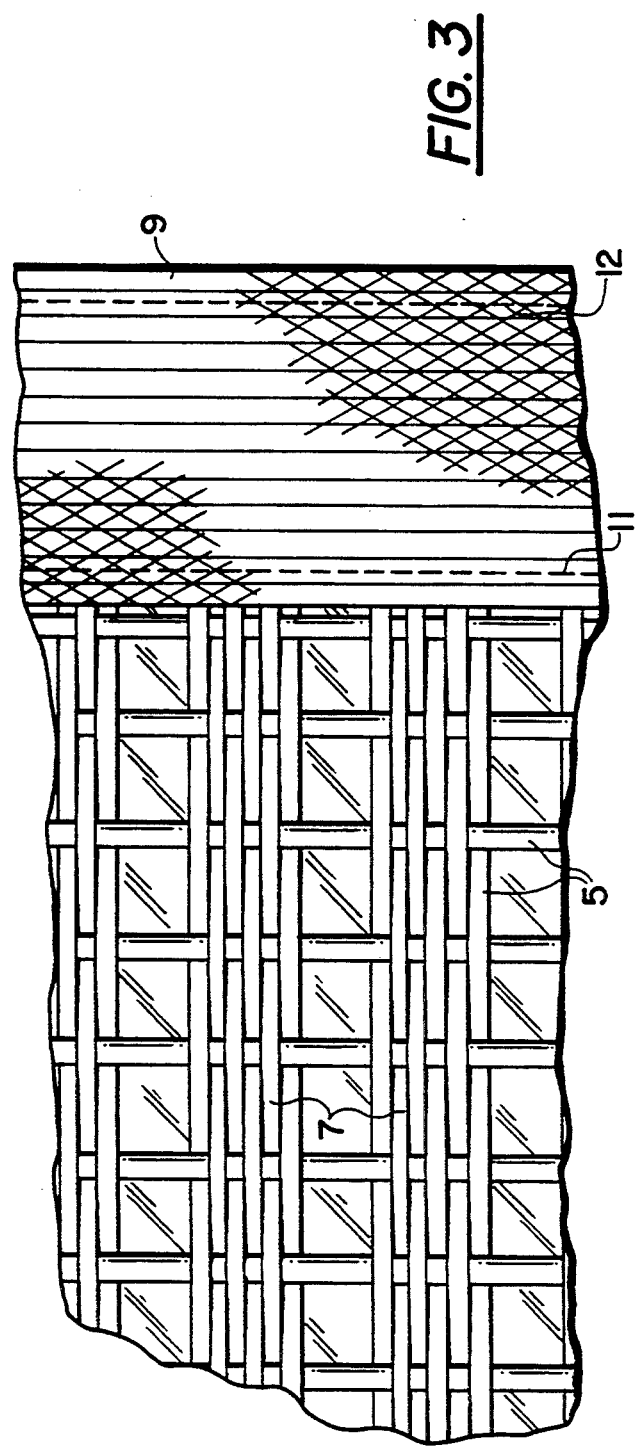

REAR WINDOW SUN SCREEN

This is a continuation of application Ser. No. 07/623,912, as PCT/AU88/00136, May 9, 1988, now abandoned upon the filing hereof.

BACKGROUND OF THE INVENTION

This invention relates to restricting passage of sunlight through a rear window of a motor vehicle.

It is now well known to use substantially rigid louvres which are shaped so as to provide selected covering of the rear window of a motor vehicle, but by reason of their shape, allow for viewing by a driver through the rear window at least with respect to following traffic.

Such devices have a first difficulty in that they are prominent insofar as the styling of the motor vehicle is concerned and that not everyone likes the looks of such devices.

The second problem is that they are bulky after manufacture and are, therefore, relatively expensive to store and to transport pending sale.

Furthermore, they can be difficult to transport subsequent to sale.

It is well known to provide film which can restrict the passage of sunlight through a window by providing a highly reflective external surface or by providing tinting.

Such materials have their place, but provide too much reflective effect if a highly reflective surface is provided on the external window which can, with coincident positions of the sun and the vehicle, cause highly blinding reflection with respect to other drivers in adjacent motor vehicles. Further, the film material has been found to be of relatively limited life and it is therefore expensive from time to time to have to replace the material and, in the meantime, when it becomes tattered, it makes the vehicle look poor. Further, such film materials are not removable and replaceable from time to time, so that whereas during some seasonal periods, people wish to have the tinting effect in place it is subsequently not at all easy to remove this and in any event the removal process will normally destroy the material, requiring replacement entirely, at high cost.

SUMMARY OF THE INVENTION

In the broadest concept, it is an object of the present invention to provide for a mesh which can be replaceably located against the outside surface of the glass of the rear window of a motor vehicle.

There are, however, a very large number of immediate problems that arise from this simple proposal.

The first surprising difficulty relates to a difficulty as to what might happen when it rains.

The difficulty here is that with mesh with reasonably fine interstices, the water can have a very significant tendency to stay, by surface tension, across the interstices and between the mesh and the external surface of the glass.

The effect of this has been found in many trials of various arrangements to ensure that it is simply not possible to see anything through the window because of the distortion effect caused by the water held in such an arrangement. Further, this can take considerable time to clear.

A surprising discovery has been, therefore, that if the mesh can be held so as to lie in contact with the external surface of the glass, water, typically from rain, appears to find the attraction between the glass and the individual fibres of mesh more attractive than across the interstices especially where the distance across the interstices is greater than the distance between the individual fibres of the glass of the vehicle window.

The effect, therefore, by achieving this is to provide that the water will clear from across the interstices returning, therefore, rear vision very rapidly after any deluge.

A further discovery is that with this arrangement, one can also use on the external side of the mesh when held against the actual surface of the glass, a windscreen wiper thus significantly improving once again the vision potential during a deluge situation.

In order to achieve these features, it has been found necessary to ensure that the mesh is secured around its own outer periphery as close as possible onto the actual surface of the glass and that the mesh being pliable, is held under tension across a convex shape only of the external surface of the rear window of a motor vehicle.

The next problem relates to securing such mesh to the rear window of a motor vehicle.

It becomes essential, from time to time, to be able to remove such mesh, both to enable the glass surface to be cleaned, and, of course, to allow for removal when a shade effect is no longer wanted by the owner, but also to enable easy installation.

A number of techniques for attachment might, at first sight, appear sensible.

For instance, it is well known to attach mesh for devices such as screen doors where the mesh is intended to limit access of insects.

A typical method for attachment of the mesh is to provide a channel, and to capture an edge of the mesh within the channel shape by a beading.

This technique, however, takes a very large time to install and also could not easily be arranged so that the edge of the mesh could be held using the securement fixing technique close to the surface of the glass.

The channel has a selected depth which is located with a mouth transversely orientated to the planar direction of the mesh being secured and the mesh would, therefore, have to stand out from the glass by this considerable distance.

Apart from this, the look of such a channel and beading fixture system is not good if intended to be located across the rear of a motor vehicle window.

One significant problem that has to be taken into account is the problem that relocation on the rear window of a motor vehicle is subjected to very extreme changes of temperature which will have the result of causing very significant thermal expansion and contraction.

The problem then, is that if the screen is fitted to be stretched with substantial tension during a hot day, during the night the mesh will contract, but, of course, the glass to which it might be attached will not change it's shape or length to the same extent due to conventional characteristics of glass.

If such contracting then causes the fitting means to loosen, because the screen is located in such a position as to be subject to windage during the motion of the motor vehicle, such loosening of contact can cause the screen to be captured by the wind and rapidly be swept away from the vehicle during motion and, of course, that could cause the screen to be lost.

Such a difficulty is simply not acceptable for a commercially available mesh screen proposal of the type being envisaged. A discovery has been that a method of fastening which meets both the needs of economy, rapidity of location and permanency when in position, can be the use of a material generally known as the trademark "Velcro" which comprises a number of loops on one surface and a number of hook-shaped parts on another.

Using such a hook and hoop type fixing technique, could indeed solve a number of the problems, but it has one major failing, namely, that if indeed engagement between the relative parts is broken by lateral force, engagement does not inherently restore fixing without transverse pressure.

What this would normally mean, therefore, is that if the attachment is loosened because of thermal contraction, attachment would not automatically be restored, someone would need to go to the back of the car and push the materials together again.

Obviously this leaves the screen subject to being readily ripped off the back.

The problem has, to a large extent, been solved by the discovery that there is a mesh-type material which incorporates, as a large proportion of the material, glass fibre and which, when used in the context of an external screen for an automotive rear window, avoids the problems mentioned above.

The advantages, therefore, are that the glass fiber will broadly have similar thermal expansion and contraction characteristics as the glass of the screen to which it is attached and will therefore maintain relative dimensional stability relative to the glass and therefore can be attached using such a technique which has all the other advantages of the hook-and-loop system.

The invention in one form provides in an arrangement providing for some protection against sun passing through a rear fixed-glass window of a motor vehicle, wherein the protection is provided by a pliable mesh held to extend across and against the external face of the glass, where the external face is of convex shape and the mesh is secured by being attached at the perimeter of the mesh and within the perimeter of the frame holding the glass, closely to the glass so as to be constrained so that substantially all of the mesh lies adjoining against the external surface of the glass.

By preference, the pliable mesh is releasably fastened so as to be held substantially against the external face of the glass by means of a hook-and-loop fastening tape combination.

By preference, the hook-and-loop fastening tape combination is such that the tapes providing such fastening extend around the entire outer exposed periphery of the rear fixed-glass window of the motor vehicle and are attached directly to the external surface of the glass providing the window.

By preference, the loop tape portion of the hook-and-loop fastening system is attached directly to the glass of the rear fixed-glass window of the motor vehicle by means of a pressure-sensitive adhesive.

By preference, the pliable mesh material is comprised of a mesh woven from strands of plastics material-coated fibreglass.

BRIEF DESCRIPTION OF THE DRAWINGS

A better understanding of the present invention will be achieved by reference to a preferred embodiment which is described hereinbelow with reference to the accompanying drawings, in which:

FIG. 2 is an enlarged fragmentary horizontal transverse cross-sectional view shown in somewhat schematic form, illustrating the way in which the mesh of the screen of FIG. 1 is attached at the perimeter of the convex surface of the glass at the rear window of the motor vehicle and also the way in which the mesh extends from the fixing to lie adjoining the surface of the glass;

FIG. 3 is a plan view of a portion of the mesh providing the shade screen, together with fixing means located along the perimeter of the mesh;

DETAILED DESCRIPTION

Figure 1:
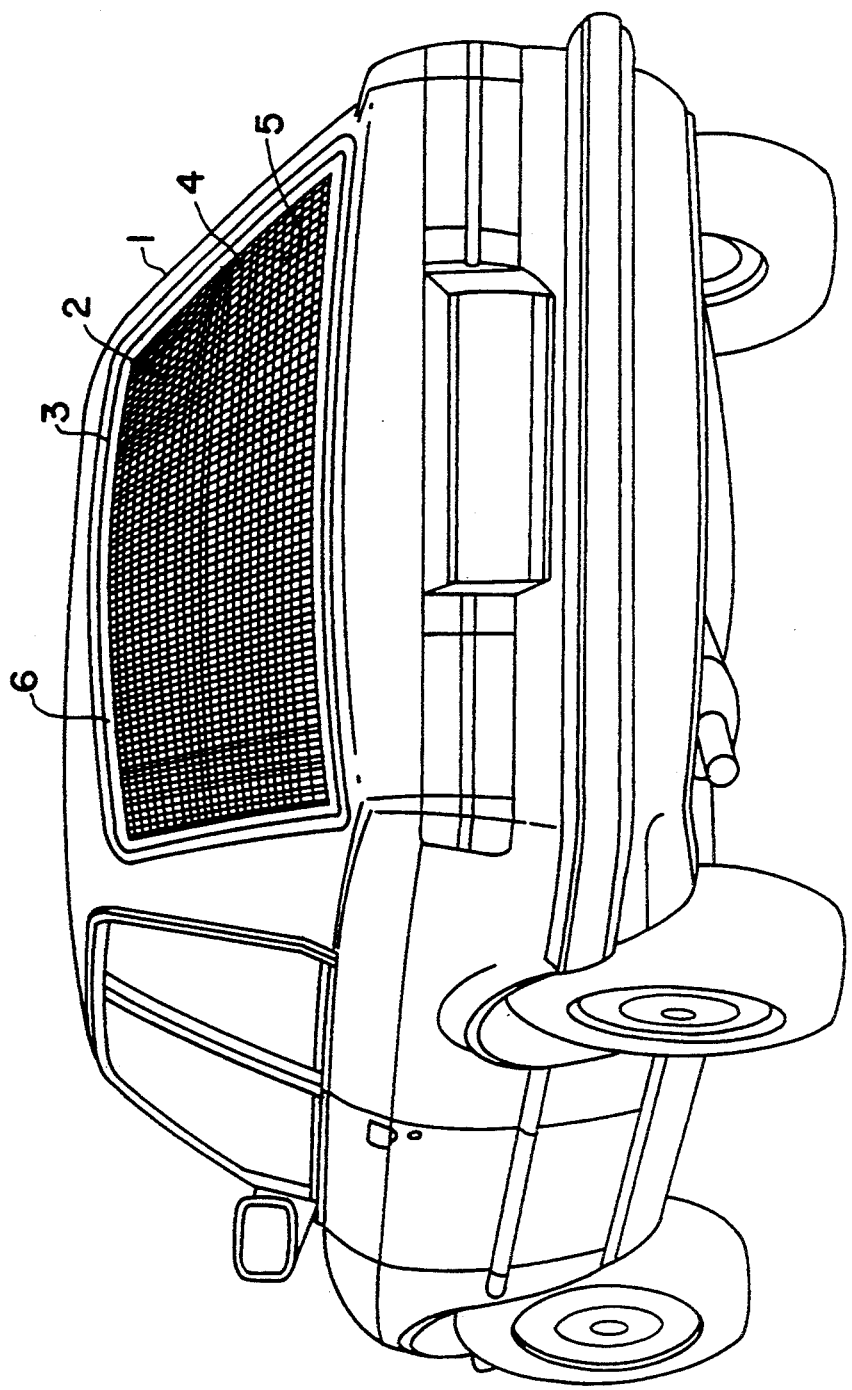
FIG. 1 is the rear perspective view of a motor vehicle, showing the location of a screen provided in accordance with principles of the present invention, and shown located in position across the fixed rear window of the motor vehicle.

Now referring to the drawings in detail, there is shown a vehicle 1 which has a rear window 2 which has fixed glass enclosed by a peripheral rubber sealing mounting strip 3.

Located so as to extend across the convex external, rear face of the glass 4 is a pliable mesh 5 which is secured by being attached at the outer perimeter 6 thereof, closely to the external, rear face of in glass 4 and, of course, by being tightly stretched across the convex shape of the glass there is achieved an engaging relationship between the external surface of the glass and the mesh 5.

The technique of fitting the mesh is better seen by reference to FIG. 2 in which the pliable mesh 5 is seen to comprise a plurality of interwoven strands in which there is a weft 7 and a warp 8.

The particular woven arrangement includes a bunched group of weft threads 7, as shown in particular in FIG. 3, and in which there are shown bunches of six wefts together, then leaving a gap before the next bunch of six weft threads.

In this embodiment, each of the threads is comprised of vinyl-encapsulated fibre glass in which the glass fibres broadly continuously extend the length of each thread and the warp has a diameter of 0.2 millimeters and the weft has a diameter of 0.3 millimeters.

As particularly shown in FIG. 2, the arrangement for securing the mesh to the convex surface of the glass 4 includes a tape 9 which is wrapped around the perimeter edge 10 of the mesh 5 and sewn at locations 11 and 12.

Across the bottom of the tape 9 there is adhered by means of a self-adhesive material a hook-tape 13, and below this and adhered directly to the surface of the glass 4, a loop-tape 14.

The hook-tape 13 and loop-tape 14 provide together, a fastening method that is well-known under the trademark "Velcro", and it is this type of fastening that this embodiment utilizes.

One particular problem relates to locating the hook-and-loop tape parts so as to provide means to retain adequate tension across the full perimeter of the mesh.

Figure 5:
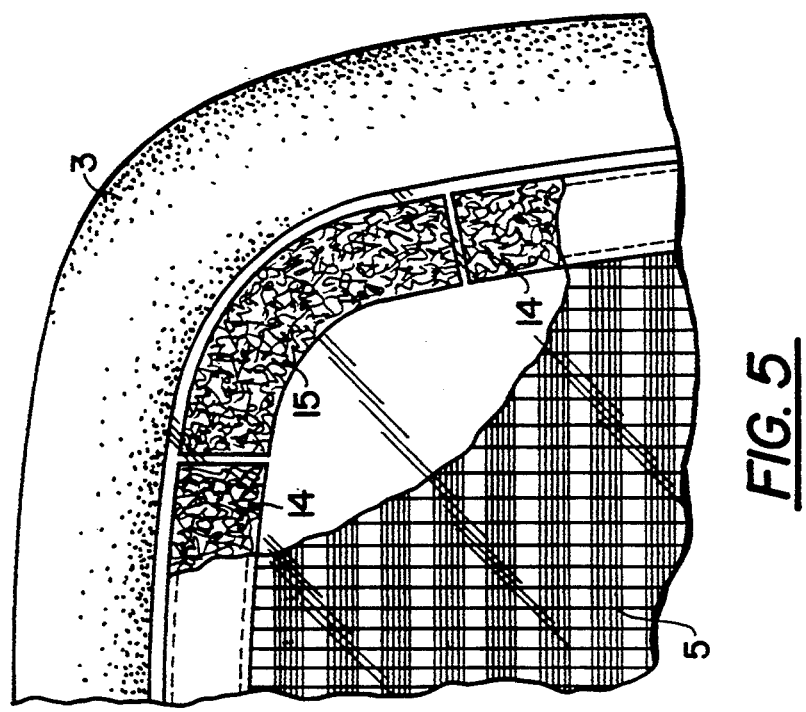
FIG. 5 shows a further arrangement showing a rounded corner as applicable to the top left or right-hand part of the rear window, as shown in FIG. 1.
Figure 4:
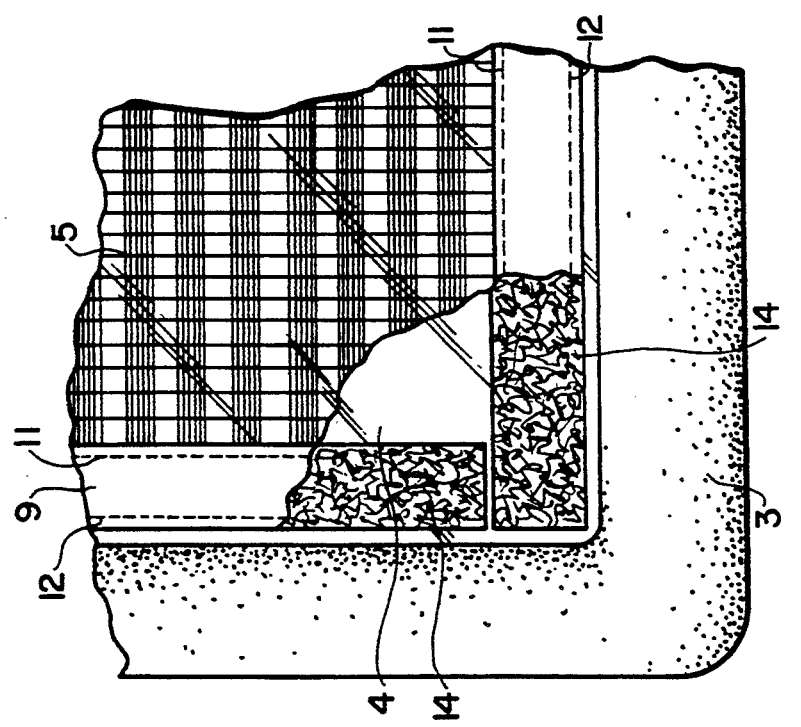
FIG. 4 shows in plan view the arrangement within a sharp corner of the rear window of a motor vehicle.
Figure 6:
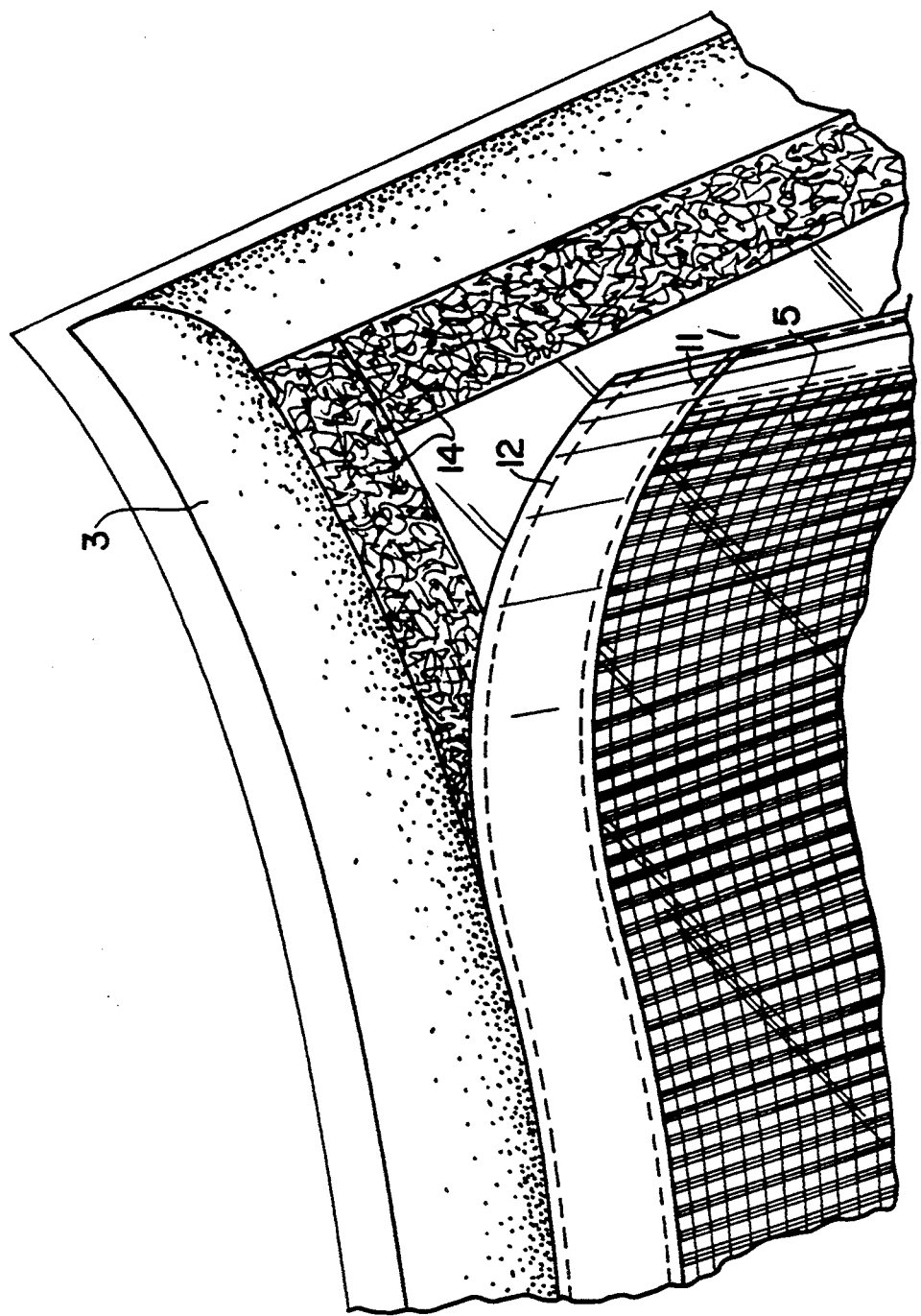
FIG. 6 shows a perspective view of the detail, as in FIG. 4, with part of the pliable mesh pulled away.

To this extent, therefore, it has been found important to provide that the loop tape 14 includes, particularly at the arcuate corners, such as the one which is shown in FIG. 5, a portion 15 which is cut in such a way that the loop direction and the corresponding hook direction on the perimeter of the mesh will be such as to provide maximum adhesion against tension from the general body of the mesh.

One of the very good reasons for this is that the mesh material will not follow compound curves on a convex shape glass unless, first of all, all of the hook-and-loop tapes are holding well and accordingly can hold all of the perimeter under tension.

It is an important feature, therefore, that the perimeter fixing is substantially around all of the perimeter of the mesh and in this embodiment is indeed fully around the perimeter and the orientation of the hook-and-loop tape at all times is such as to provide maximum reaction against release from such tension.

When the mesh is placed in position, great care must be taken to pull the mesh tightly and continually pull the mesh tightly as it is fitted.

Pulling the mesh tightly as it is fitted will provide an appearance which is almost skin-like against the external surface of the rear of the glass of the motor vehicle.

The hook-loop material has been selected to meet the Military Specification F21840 Type 2 Class 1.

The mesh material has been selected to withstand a range of temperatures between minus twenty-nine degrees Centigrade and ninety-three degrees Centigrade.

In trials conducted, the mesh with the arrangement described was located on the rear of a motor vehicle and fitted so as to effect a sustained tension over all of the mesh while the temperature of the air within the vicinity was approximately five degrees Centigrade.

Subsequently, the motor vehicle was moved so that the temperature rose to forty-five degrees Centrigrade whereupon there was no observed slackness or loosening of the fixing of the Velcro-type hook-and-loop system.

Testing the deluge visibility with the same screen installed, water was poured onto the screen so that there was ample excess running off the screen while the vehicle was still.

As this would be the worst case, it was noticed that most of the interstices were cleared of water within ten minutes.

When the mesh was pulled away from the glass, there appeared to be significant water still remaining on the glass but this water did not appear visible when the mesh was returned, under tension, and held tightly against the surface of the glass. It appeared, therefore, that the water was being held under surface tension between the individual threads, but not acting to extend across the interstices and therefore to distort or block vision.

I claim:

1. In combination:
a motor vehicle having a fixed-position rear window made of glass having a given coefficient of thermal expansion having an external rear facial surface which is convexly curved about an axis which extends generally heightwise of the rear window; said motor vehicle having body wall means defining a rear window aperture therethrough; and frame means mounting said rear window in said aperture, so that said external rear facial surface is bounded by an outer perimetrical margin;
a sun screen member comprising a body of pliable mesh material having a central portion bounded by an outer perimetrical portion; said mesh material having an array of openings defined among a network of material having an inner facial surface; and securement means so tautly securing said body of mesh material, along said outer perimetrical portion thereof, to said external rear facial surface of said rear window, in said outer perimetrical margin thereof, that said inner facial surface of said mesh material is held in pressing engagement with said external rear facial surface of said rear window, throughout substantially all of the heightwise and widthwise extent of said central portion, including upon convexly curved regions of said external rear facial surface of said rear window.

2. The combination of claim 1, wherein:
said securement means comprise two sets of removably interengaged strips, respectively having hook and loop fasteners, one said set being secured to said rear window, and the other said set being secured to said body of mesh material.

3. The combination of claim 2, wherein:
said one set is provided on and extends around substantially all of said outer perimetrical margin of said external rear facial surface of said rear window.

4. The combination of claim 2, wherein:
said one set is a set of loop fastener strips secured directly to said external rear facial surface of said rear window by a pressure-sensitive adhesive.

5. The combination of claim 1, wherein:
said body of mesh material is woven of plastic-coated fiber glass.

6. The combination of claim 1, wherein:
said body of mesh material is woven of vinyl plastic resin-coated fiber glass.

7. The combination of claim 3, further including:
a reinforcement tape secured to said body of mesh material so as to extend around substantially all of said outer perimetrical portion of said body of said mesh material; said other set of strips being secured to said body of mesh material via said reinforcement tape.

8. The combination of claim 7, wherein:
said one set is a set of loop fastener strips secured directly to said external rear facial surface of said rear window by a pressure-sensitive adhesive, and said other set is a set of hook fastener strips.

* * * * *